United States Patent [19]
Appleby et al.

[11] 3,784,437
[45] Jan. 8, 1974

[54] TIRE BUILDING APPARATUS

[75] Inventors: Paul E. Appleby, Cuyahoga Falls; Denver C. Folden, Akron; Donald C. Kubinski, Seville, all of Ohio

[73] Assignee: The Goodyear Tire & Rubber Company, Akron, Ohio

[22] Filed: Dec. 2, 1971

[21] Appl. No.: 204,167

Related U.S. Application Data

[63] Continuation of Ser. No. 880,522, Nov. 28, 1969, abandoned.

[52] U.S. Cl. .................. 156/401, 156/132, 156/415, 156/416, 156/417
[51] Int. Cl. ..................... B29h 17/16, B29h 17/22
[58] Field of Search .................... 156/414, 415, 416, 156/417, 401, 135, 132

[56] References Cited
UNITED STATES PATENTS

| | | | |
|---|---|---|---|
| 1,525,455 | 2/1925 | Logan | 156/401 X |
| 2,084,009 | 6/1937 | Sohl | 156/416 |
| 3,014,521 | 12/1961 | Barber et al. | 156/416 X |
| 3,188,260 | 6/1965 | Nebout | 156/415 |
| 3,265,549 | 8/1966 | Woodhall et al. | 156/416 X |
| 3,386,875 | 6/1968 | Grote | 156/416 |
| 3,433,695 | 3/1969 | Garetta et al. | 156/415 X |
| 3,582,435 | 6/1971 | Frazier | 156/401 |

FOREIGN PATENTS OR APPLICATIONS

| | | | |
|---|---|---|---|
| 746,868 | 11/1966 | Canada | 156/416 |
| 714,025 | 7/1965 | Canada | 156/414 |
| 983,349 | 2/1965 | Great Britain | 156/414 |
| 67,115 | 5/1968 | Australia | 156/414 |
| 1,000,262 | 8/1965 | Great Britain | 156/416 |

*Primary Examiner*—Clifton B. Cosby
*Attorney*—F. W. Brunner and R. S. Washburn

[57] ABSTRACT

A tire building apparatus having an expandable-collapsible drum for which an elastic tubular membrane forms the drum surface, and a pair of annular members disposed for radial and axial movement on and relative to a pair of rigid axially movable end members cooperable with the membrane to expand the drum surface to a high crown and an expanded cylindrical stiffly supported building surface.

37 Claims, 6 Drawing Figures

FIG. 1

INVENTORS
PAUL E. APPLEBY
DENVER C. FOLDEN
DONALD C. KUBINSKI

AGENT

FIG. 2

INVENTORS
PAUL E. APPLEBY
DENVER C. FOLDEN
DONALD C. KUBINSKI

AGENT

TIRE BUILDING APPARATUS

This is a continuation of application Ser. No. 880,522 filed Nov. 28, 1969, now abandoned.

The foregoing abstract is not to be taken as limiting the invention of this application, and in order to understand the full nature and extent of the technical disclosure of this application, reference must be made to the accompanying drawings and the following detailed description.

The present invention relates to the manufacture of tires and particularly to tire building apparatus including a tire building drum.

Tire building drums of the class adapted to expand in diameter so as to provide shoulders and end faces in one or more plies wrapped thereon against which the beads or bead assemblies may be placed have, despite their manifest convenience for tires of passenger car size and construction, when modified to provide the relatively large diameter change characterizing high crown drums, become unduly complex and expensive and may even lack adequate uniformity and continuity of support during the operations of stitching down successive plies of material placed about the drum to form the tire being built.

Drums having an amount of diametral change in contracting or expanding suitable for relatively stiff carcasses of the type usually requiring high crown drums have been characterized by a multiplicity of rigid parts or by excessively soft and unstable inflatable membranes. The drums having rigid parts, while offering sturdy and stable building surfaces, require either mechanical linkages or inconvenient disassembly of parts to enable removal of a tire carcass therefrom. Drums having inflatable membranes, while readily collapsed for removal of a tire carcass, lack the desired rigidity to allow rapid and firm stitching to adhere elements of the carcass to one another as they are applied to the drum.

It is, therefore, a primary object of the present invention to provide a tire building drum having a tubular elastic cover suitably controlled to provide the desired shape while at the same time providing in the desired shape adequate uniformity and continuity of underlying support.

It is a further object of this invention to provide enhanced simplicity and operating convenience in a tire building drum.

Other objects and advantages of the instant invention will become apparent or be particularly pointed out in the following description of a particular embodiment of the invention and with reference to the accompanying drawings in which:

FIG. 4 is a partial view in longitudinal cross-section illustrating features of the apparatus of FIG. 1;

Tire building apparatus including rotatable building drums on which the components of a tire are assembled are generally known in the art. Apparatus of the class normally includes a base and a housing in which drive means for rotating the building drum, suitable connections to fluid pressure supply, and other mechanisms associated with the operation of the building drum are placed. These elements of the apparatus, being well known and outside of the scope of the present invention will not be described in detail herein.

Figure 1:
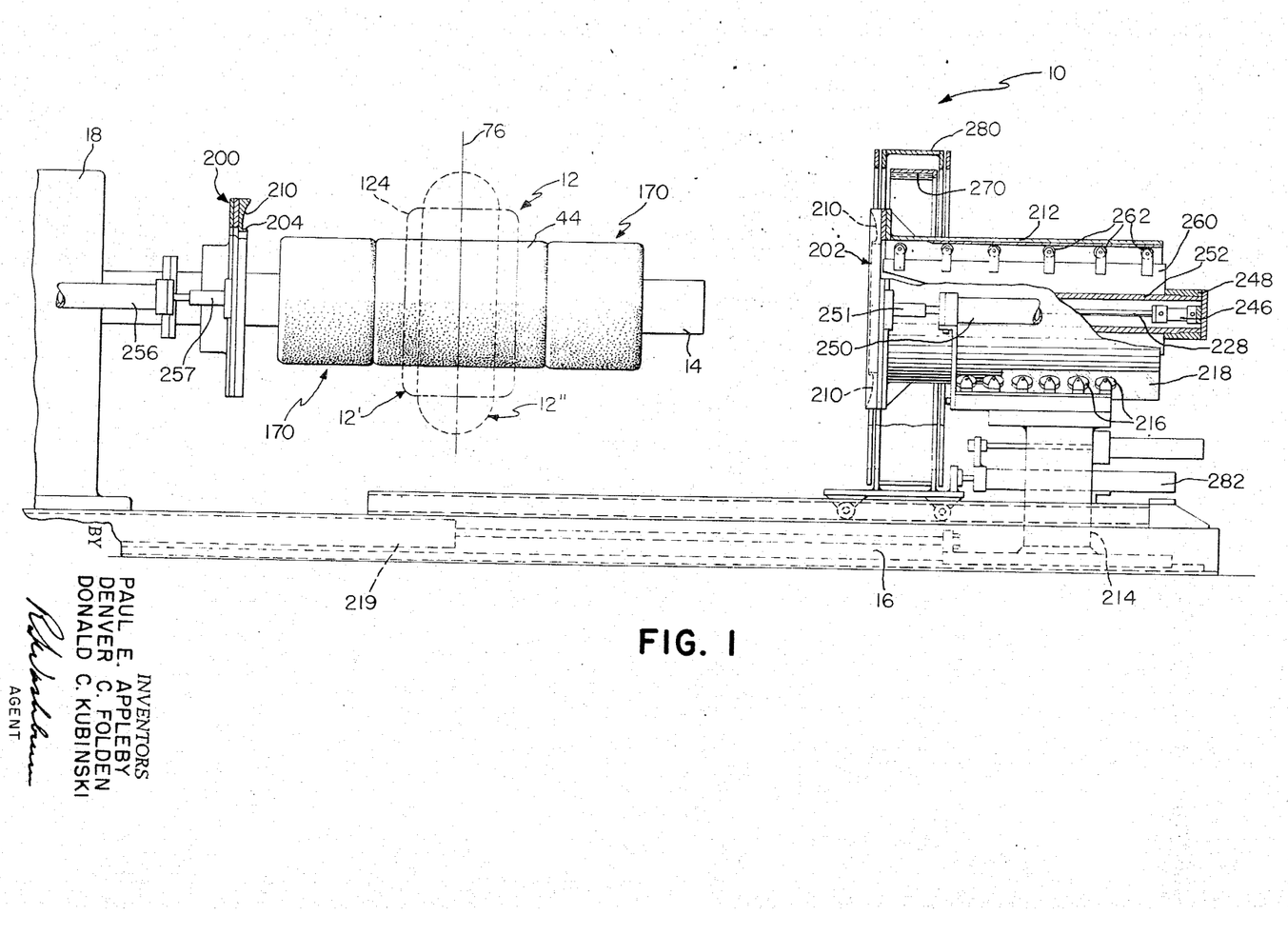
FIG. 1 is a longitudinal elevation view of a tire building apparatus according to the instant invention.
Figure 2:
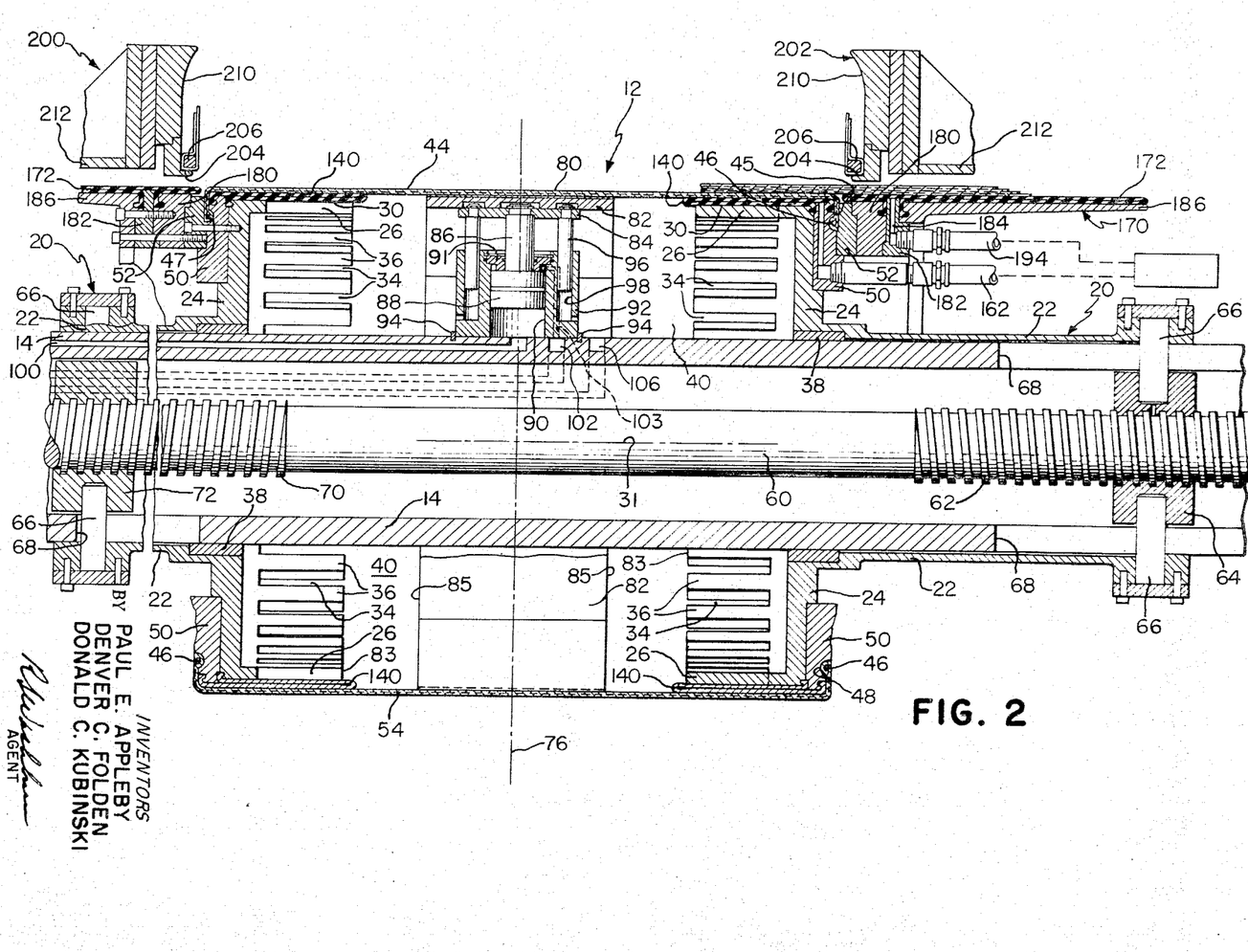
FIG. 2 is a partial longitudinal sectional view of the apparatus of FIG. 1, the drum being in an uninflated cylindrical state.

As seen in the drawings, particularly in FIGS. 1 and 2 thereof, the apparatus 10, in accordance with the present invention, includes the tire building drum 12 capable of assuming a plurality of configurations, and a shaft 14 supporting the drum 12 relative to the base 16 and the housing 18. The shaft 14 is mounted upon suitable supporting bearings within the housing 18 and extends therefrom as a cantilever, the drum 12 being supported coaxially and corotatably therewith.

The drum 12 comprises a pair of end members 20, FIG. 2, each including a tubular member or sleeve 22 slidably mounted in coaxial relation upon the shaft 14 and a web 24 extending radially outward from the sleeve 22 and terminating in a rigid tubular cylindrical member or shell 26 disposed coaxially of the shaft 14 and providing a rigid exterior cylindrical surface 30 disposed coaxial of and at fixed radial distance from the drum axis 31 and extending axially toward the other end member. The shells 26 are of equal outer diameter and each has a multiplicity of axially extending spaces or slots 34 and intervening fingers 36 extending from the inner end thereof and offset about the axis of the shaft 14 relative to the slots and fingers of the other shell so that the fingers of one shell can enter the slots of the other shell in interdigitated relation upon sufficient movement of the shells coaxially toward each other.

The circumferential dimensions of the respective slots 34 and fingers 36 are sufficiently small that the surfaces 30 are satisfactorily bridged by the overlying rubber parts, to be described, to provide substantially continuous support for stitching plies laid about the drum 12 when the latter is in its cylindrical uninflated state. The axial length of the surface 30 will be discussed in more detail later herein.

Each of the sleeves 22 is bored to receive the bushing 38 slidably engaging the shaft 14 and fitted with O-rings (FIG. 3) or like sealing devices in order that the chamber 40 is defined in part by the end members 20 and by the shaft 14 will be capable of retaining fluid pressure for purposes which will be detailed subsequently herein.

Figure 3:
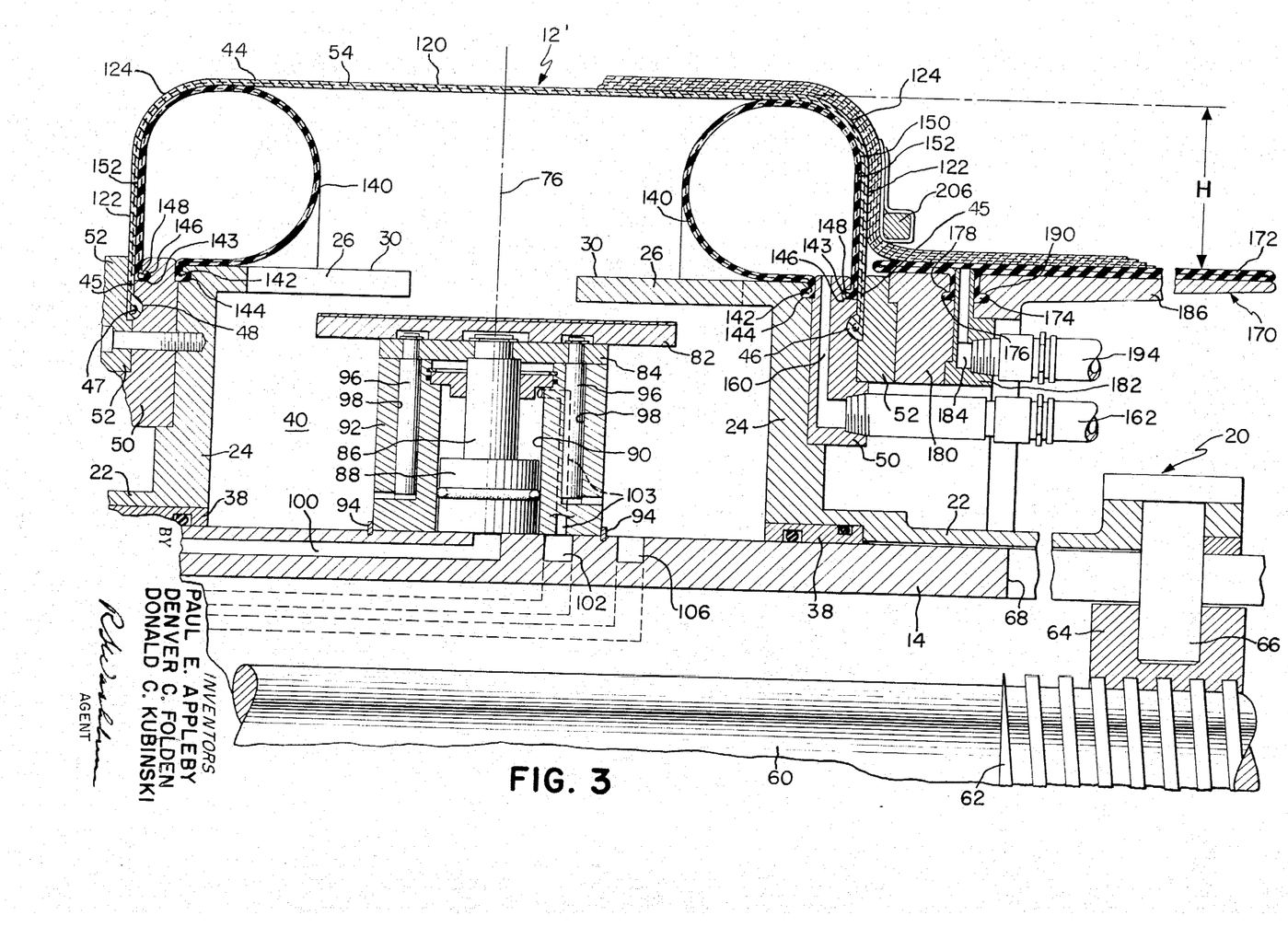
FIG. 3 is a partial longitudinal sectional view of the apparatus of FIG. 1, the drum being in an expanded state.

Referring also now to FIG. 3, the drum 12 is provided with a building sleeve in the form of a cord reinforced elastic circumferentially expandable tubular membrane 44 having a generally cylindrical portion terminating at its ends in annular edges 45 turned radially inward at the respective ends of the drum 12 along the outward face of the intermediate clamp rings 52 and there terminating in the form of annular beads 46, 47 each one of which is fixed in an annular groove 48 in the respectively associated intermediate clamp ring 50 affixed to the web 24. Each bead 46, 47 is held in its groove 48 by a second annular ring 52.

The annular edges 45 of the membrane 44 are held in fixed relation radially of the longitudinal axis 31 of the membrane and the drum 12 by its securement to the end members 20.

The cords 54 of the reinforcing fabric in the membrane 44 extend from bead 46 to bead 47 and are preferably aligned parallel or very nearly parallel to the axis 31 of the tube and of the drum 12. The cords 54 are of a material and quality suitable for use in the fabrication of tires and include a material such as rayon, nylon, or polyester, or metallic wire, and may be disposed at angles other than prallel to the axis, noting that it is desirable that the membrane be substantially inextensible in axial length and be expandable circumferentially to a suitable degree, as will presently appear. Cord angles will, therefore, be at from 0° to about 20° relative to a line parallel to the axis 31 of the drum, which is to say from 90° to about 70° with a circumferential line about the membrane and drum. With cord angles other than 90° with the circumferential line, a plurality of cord plies are used, the respective angles being equal and of opposite hand with respect to the circumferential line.

The membrane 44 is impervious to fluid, such as air, and together with the end members 20 and the shaft 14 previously referred to, defines the fluid retaining chamber 40 within the drum.

Means for moving the end members 20 axially, toward and away from the central or equatorial plane 76 of the drum are provided by a screw 60 extending coaxially within the center shaft 14, one portion 62 of the screw being provided with right-hand screw threads which engage a suitably threaded nut 64 connected to the sleeve 22 of the associated end member 20 by a pair of pins 66 which pass through longitudinally extending slots 68 in the wall of the tubular shaft 14. The other portion 70 of the screw has left-hand threads and is engaged by a suitably threaded nut 72 connected in the same manner with other end member 20. Driving means in the form of a hydraulic motor located within the housing 18, effect rotation, or stopping, of the screw 60, so as to move the respective end members 20 toward or away from each other and toward or away from the mid-circumferential plane 76 of the tire building drum 12. In order to move the end members 20 toward and away from each other, the screw 60 is rotated by the driving means, which also serves to stop and hold the end members 20 at predetermined axial spacing relative to one another and to the equatorial plane 76.

As may be seen in FIG. 2, the tubular membrane 44 when uninflated provides a cylindrical outer working surface 80 when the end members 20 occupy their axially outermost positions, determined in accordance with the length of the cylindrical portion of the membrane 44.

In the flat or cylindrical state of the drum 12, as seen in FIG. 2, the central portion or intermediate span of the cylindrical portion of the tubular membrane 44 is supported by central support means comprising a plurality of rigid, parti-cylindrical segments 82, each of which is attached to a support plate 84. Each of the segments 82 has an outer parti-cylindrical surface having a radius of curvature equal to that of the cylindrical outer surfaces of the shells 26. To provide versatility in the structure, the segments 82 are made removable and can be replaced by segments of other axial length such that the axial length of the segments 82 plus the axial lengths of the shells 26 at least approximately equal the axial length of the membrane 44. The axial width of the gap between the respective ends 83 of the shells 30 and the respectively associated axial ends 85 of the segments 82 is from about 1 to about 2½ inches without disadvantage. The ends of the segments 82 may engage the webs 24, as will later appear, when the segments occupy their radially inward positions and the end members 20 are moved axially inwardly toward one another to limit such movement of the end members. The membrane while in its generally cylindrical contracted state is supported for stitching of tire carcass components thereon, the membrane being supported over the short gaps referred to by its own axial tension. Each support plate 84 is affixed to the piston rod 86 of a piston 88 reciprocable within one of a plurality of cylinders 90 formed in the body 92 which is mounted on and secured corotatably with the central shaft 14 symmetrically with respect to the mid-circumferential plane 76. The split rings 94 received in suitable grooves in the shaft secure the body against axial displacement. A pair of guide pins 96 affixed, respectively, to each support plate 84 are slidingly received in a pair of radial bores 98 which are parallel to the respective cylinders 90.

Each of the cylinders 90 is connected by a passage 100 extending through the center shaft 14 to a controlled source of fluid pressure, which fluid pressure, when admitted, serves to move the pistons 88 radially outwardly to place the segments 82 into supporting contact with the central portion of the inner surface of the tubular membrane 44. Outward movement of each piston and its associated segment 82 is stopped by contact of the piston 88 against the plug 91. When the segments are in their radially outer limit position, the outer surfaces thereof are aligned with the outer cylindrical surfaces of the shells 26. A second passage 102 within the wall of the center shaft 14 and communicating with a passage 103 in the body 92 places the rod end of each of the cylinders 90 in communication with a controlled source of fluid pressure, pressure being admissible through the passage 102 to the rod ends of the respective cylinders 90 to retract the double acting pistons 88 and the respective segments 82 radially inward sufficiently to clear the inner diameter of the shells 26, previously discussed, so that the shells may be telescopically arranged over the segments when the shells are moved toward each other, as shown in FIG. 3.

The passage 106, also contained in the wall of the center shaft 14, provides for the admission of fluid pressure into the chamber 40 within the drum and for exhaust of fluid pressure therefrom.

As is well known in the tire building art, movement of the annular ends 45 of the tubular membrane 44 toward each other and toward the mid-circumferential plane 76, accompanied by an increase of fluid pressure therewithin, will cause the membrane 44 to expand circumferentially and to assume a natural shape which is dependent upon the spacing between the ends 45, and the particular arrangement of the cord reinforcing fabric within the membrane. In this natural shape the membrane will assume a curve in cross-section which is continuous, or at least free of any abrupt change in radius of curvature.

Illustrated in FIG. 3, it is a particular feature of the instant invention that the membrane 44 can be expanded to form a high crown drum state 12' having a flat cylindrical tire building surface 120 and opposed annular end faces 122 connected with the surface 120 by large radius shoulders 124. The crown height H can be adjusted in relatively infinitesimal steps from 0 to 3 or more inches of radius, (6 or more inches measured as a change in drum diameter). The cylindrical building surface 120, as will be appreciated, enables the application of tire elements without distortions thereof as can result from compound or spheroidal curvatures in the building surface. As will be further shown presently, the membrane 44 in its expanded state is provided with firm uniformly distributed support. The shoulder radii referred to generally exceed one-fourth of the radial expansion of the membrane. The end faces 122 preferably extend radially and with the shoulders 124 are firmly and uniformly supported. The natural shape of the membrane 44 when inflated is reformed, as will be shown, to provide the shape 12' herein described.

In accordance with the invention, referring now particularly to FIG. 3, separate radially expandable means for acting directly on each of two axially spaced apart portions of the interior surface of the membrane 44 are provided in the form of a plurality of expansible annular members disposed concentrically within the membrane 44 and each having a circumferentially continuous and expandable surface portion which is engageable at least on being expanded with a confronting annular interior surface of the membrane 44 so as to exert thereon an outwardly directed and circumferentially uniformly distributed force. The annular members are disposed closely adjacent the opposite end, respectively, of the cylindrical portion of the membrane 44 and operate in cooperation with the axially inward movement of the end members 20 to effect radial expansion and predetermined shaping of the end portions of said cylindrical portion to provide the desired end faces and large radius shoulders in the tubular membrane 44. Each member is, in the specific embodiment hereof, an inflatable elastomeric bladder 140 disposed coaxially of and within the tubular membrane 44 and axially between one of the edges 45 and the mid-circumferential plane of the drum 12. More specifically, in the presently preferred embodiment, each bladder 140 is disposed immediately adjacent an end of the cylindrical portion of the membrane 44, and while deflated extends in cylindrical form coaxially of and along the surface 30 of the respective shell 26 in contact with the membrane 44 from its annular edge 45 axially inwardly toward the plane 76.

The annular member or bladder 140 is capable of smooth displacement both radially and axially relative to the surface 30 of the end member 20 on which it is carried. On inflation of the bladder the surface 30 provides a rigid surface against which the bladder may act so that the bladder surface in contact with the confronting interior surface of the membrane 44 moves radially and axially outwardly relative to the end member 20, such radially and axially outward movement of the bladder being without significant slip or like relative movement between it and the surfaces in contact therewith. The action is, in effect, a rolling outwardly of the bladder 140 along the surface 30 and axially outwardly along the inner surface of the membrane 44 which, as the bladders 140 are being expanded, reforms the membrane 44 to the shape 12' which is illustrated in FIG. 3.

In the specific embodiment of FIG. 3, each bladder 140 comprises a cord reinforced circumferentially elastic endless membrane which is cured in cylindrical form having a diameter equal to or slightly less than the diameter of the shell 26 on which the bladder is mounted. The membrane, as cured, has a pair of annular edges or ends 142, 143 the former of which is received in a suitable circumferential continuous groove 144 formed in the axially outward face of the web 24 and anchored therein by the intermediate clamp ring 50. The membrane is folded back upon itself and the other annular edge 143 is fixed in a suitable annular groove 146 formed in the axially outward face of the ring 50 and anchored conjointly with the annular edge or end 45 of the drum cover membrane 44 by the ring 52. The axial spacing between grooves 144 and 146 can be varied but should not be greater than about one-half of the desired height H measured as a change in drum radius or about one-fourth of the cross-sectional contour length of the bladder. For the purpose of this invention, the cross-sectional contour length of the bladder is the distance measured circumferentially of and along the median thickness line of the bladder when the bladder is viewed in cross-section as in FIG. 2 but exclusive of its clamped edge portions. It will be noted, however, that the annular member is required to cooperate or interact with the membrane 44. The groove 146 retaining the edge 143 of the bladder 140 will be located sufficiently close to the edge 45 of the membrane 44 where it is retained by the end member 20 so that the surface 150 can act upon the surface 152 as described.

When deflated, as may be seen in FIG. 2, the shoulder bladders 140 each extend axially toward the other lying tightly on the respective surfaces 30, the width of the bladder 140 and the location of the edge 142 being such that the folded edge or bight portion joining the outer cylindrical and inner cylindrical reentrant portion of the bladder extends a small distance beyond the end 85 of the shell 26. In the specific embodiment the cross-sectional contour length of the bladder 140 is 12 inches and is determined by the amount of crown H desired, 3 inches in the drum 12'.

The cords of at least one ply of the fabric reinforcement of the bladder 140 extend from edge to edge at or very nearly at 90° with respect to the circumference of the bladder.

In the specific embodiment of the bladders 140 being described includes in addition to plies of rubber compounds, an intermediate ply with substantially inextensible tire cord oriented at 90°, a radially outer ply of substantially inextensible tire cord at 88° and a radially inner ply of substantially inextensible tire cord also at 88° being at a 4° angle with the outer ply. The cords of each of the plies are wrapped about or otherwise secured to an inextensible bead core or grommet 148 made of wire within the bead 143. This reinforcement of the bladder provided the bladder with a substantially fixed cross-sectional contour length so that when the bladder is in its cylindrical form, as shown in FIG. 2, the bladder is substantially inextensible in a direction parallel to the drum axis.

It will be apparent that the bladders 140 of the present embodiment are identical and appear in the drawings as opposite in hand inasmuch as they are mounted at opposite ends of the drum.

As will be recognized by those skilled in the art, the bladders 140 when unconstrained will be expanded by fluid pressure introduced therewithin to a natural shape determined by the spacing between the beaded edges and the arrangement of the cords of the reinforcing within the bladder. As will be apparent from an inspection of FIG. 3, the bladder 140 is also displaced from its natural shape and position by its interaction with the tubular membrane 44 forming the cover of the drum in its state 12'. The circumferential surface portion 150 of the bladder 140 which is in contact with the annular interior surface 152 of the membrane 44 thus exerts on the membrane 44 substantially the full fluid pressure contained within the bladder 140 with the result that the face 122 and shoulder 124 of the drum are continuously and uniformly supported about the circumference so as to provide firm, stable, and uninterrupted support for tire building thereon.

Moreover, the relatively large radius shoulders 124, joining the cylindrical outer surface 120 of the drum and the end faces 122 are likewise supported uniformly and continuously throughout the circumference and provide as well that tire plies turned or formed about the shoulders to receive a bead are subjected to less strain than with a conventional expandable drum having a very much smaller radius at its shoulders.

Prior to or during the movement of the end members 20, the previously described segments 82 can be retracted by manipulating the air pressures acting on the pistons 88 so that the segments are withdrawn radially inwardly to clear the shells 26 of the end members 20 as they approach one another.

Fluid pressure is admitted to or released from the bladders 140 through the passages 160 formed in the intermediate clamp rings 50, which passages are connected by flexible piping 162 to conventional fluid pressure control means. Pressure for the inflation of the bladder 140 for satisfactory operation must exceed the pressure within the chamber 40 and may be from 2 to 5, or more, atmospheres. It is desirable generally to provide a positive fluid pressure of up to about 1 atmosphere within the chamber 40 to insure that the surface 120 of the tubular membrane between the shoulder bladders will be firmly supported. It will be observed that the fluid pressure in the chamber 40 acts axially on the radially extending area of both of the bladders 140. The force thus exerted produces axial tension in the membrane 44 augmenting the axially outward thrust of each of the bladders 140. The cylindrical surface 120 of the membrane 44 is thus reinforced as a firm tire building surface 120 not only by the radial component of the pressure in the chamber 40 but also by the axial tension in the membrane.

The tire building drum 12 is provided with ply turn-up means including the auxiliary drums 170 of a diameter at least approximately equal to the diameter of the contracted building drum 12. The auxiliary drums 170 are removably attached as units to the building drum 12 itself and each carries on its peripheral surface a turn-up bladder 172 having annular terminal edge beads 174, 176. As may be seen in FIG. 3, the beads 176 are secured in suitable grooves 178 provided in the mounting rings 180 forming part of the auxiliary drums 170. The throat rings 182, in which are one or more passages 184 for communicating fluid pressure to and from the turn-up bladders 172, are in turn secured against the rings 180 by the drum extensions 186 in which annular grooves 190 receive the beads 174. The several rings 50, 52 with 180, 182 and 186, are secured coaxially of and to each other and the webs 24 by conventional fastening means (not shown) for convenient assembly and disassembly. The passages 184 are connected by flexible piping 194 to a suitable controlled source of fluid pressure.

Reverting to FIGS. 1 and 2, the apparatus 10 provides a pair of bead setting devices 200, 202, one operative at each end of the drum 12. Each device includes a bead retaining seat 204, and is movable coaxially of the drum from the respective rest positions illustrated in FIG. 1 to respective positions placing the beads 206 adjacent the ends of the drum 12 as indicated in FIG. 2. As the drum 12 is expanded to the shape or state 12', shown in FIG. 3, the bead setting devices 200, 202 are moved axially inwardly coincidently with the movement of the end members 20, the hydraulic cylinders 250, 256 driving the devices 200, 202 being controlled in timed relation with the hydraulic motor driving the screw 60. The ply or plies on the drum 12 are expanded between the beads 206, and the ply and beads are engaged by the movement of the membrane 44 and particularly of the end faces 122 thereof while the ply endings axially outward of the drum 12 and of the beads remain on the uninflated turn-up bladders 172.

The bead setting devices each include an annular pressing ring 210 disposed coaxially of and extending generally radially outwardly of the respective bead seats 204. The device 202 serving the drum 12 at the end thereof remote from the housing 18 is carried at the end of a rigid cylinder 212 which is mounted coaxially of the drum and is axially reciprocable upon and relative to a pedestal 214 provided with a plurality of roller guides 216 bearing on tracks 218 carried by the cylinder 212. The pedestal 214 is movable, in response to movement of the piston rod of the cylinder 219 disposed in the base 16, axially of the drum 12.

Figure 4:
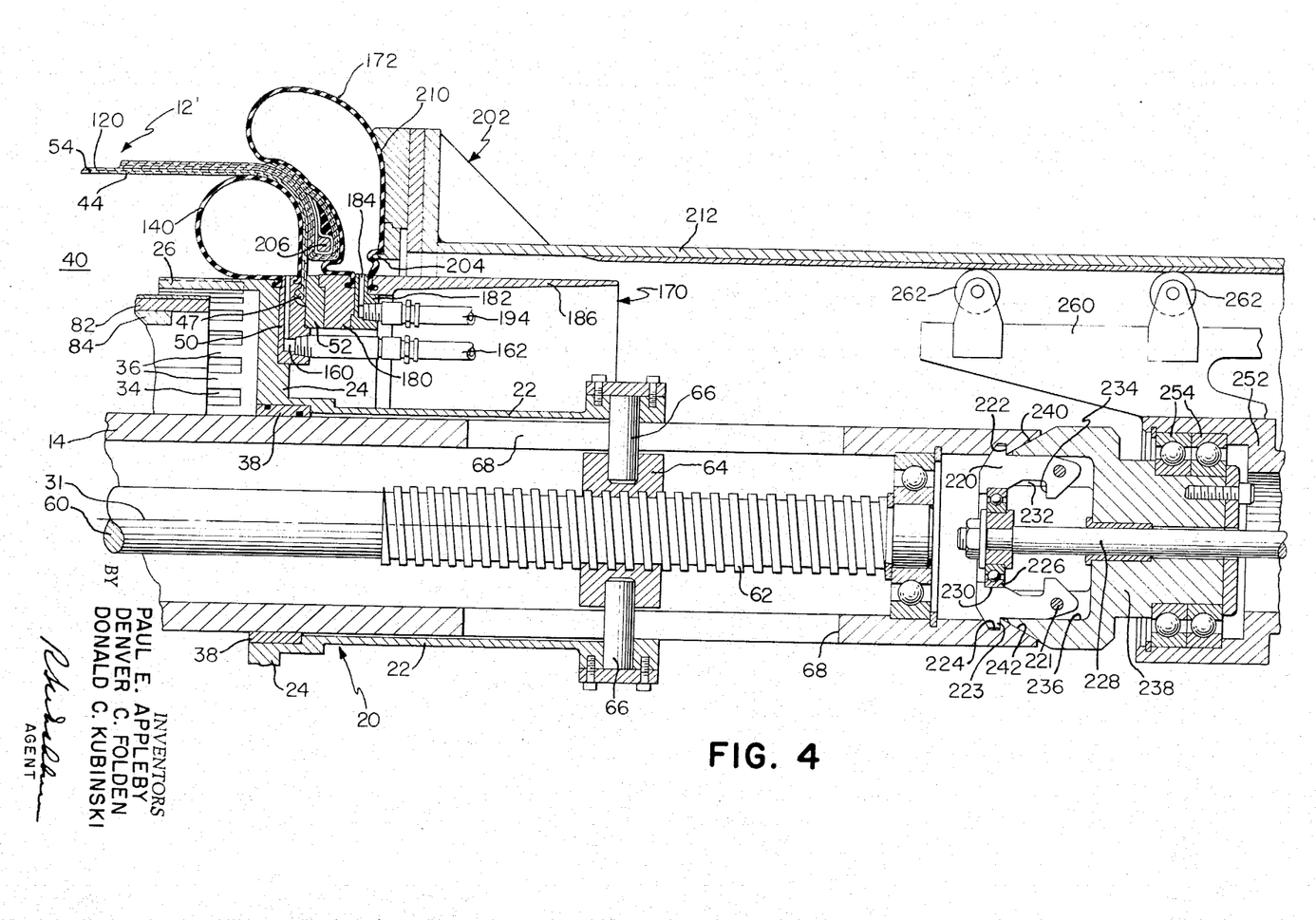

Referring to FIG. 4, a further aspect of the invention provides lock means connecting the annular pressing ring 210 and the shaft 14 to oppose or resist the axial force exerted between the pressing ring and the turn-up bladder 172. The said force and the force carried by the lock means have equal and opposite lines of action both of which are substantially in line with the drum axis 31 and thus no large bending moments are communicated to the machine base 16. In the apparatus 10 lock means comprise a set of three hooked levers 220, each one of which is mounted on a pivot pin 221, and an annular radial face 222 of a groove 224 formed in the inner wall of the shaft 14, which groove receives the latching hook portions 223 of the levers 220 when the levers are swung radially outward about the respective pins 221. Movement of the levers 220 is effected by an anti-friction bearing 226 carried by a push rod 228 extending coaxially of the structure of the device 202. The bearing 226 is movable between: a locking position, wherein the bearing urges the levers 220 outwardly; the hook portions 223 of the levers 220 entering the groove 224 to engage the face 222 while the bearing 226 abuts the lever surfaces 230; and a release position wherein the bearing 226 encounters the disengagement hook surfaces 234 causing the levers to rotate radially inward, moving the latching hook portions 223 out of the groove 224, the clearance contour 232 of the levers accommodating the bearing 226 in its released position.

The levers 220 are spaced angularly about the axis 31 and within an axially extending recess 236 formed concentrically within a live center 238 having a frusto-conical surface 240 disposed to engage a conjugately coned seat 242 formed coaxially of and in the end of the shaft 14. The center 238 is rotatably mounted in a pair of ball thrust bearings 254 coaxially of and on a central tubular member 252 which forms part of the structure carrying the cylinder 212 and the pressing ring 210 which are telescopically movable coaxially of the member 238. Affixed transversely to the end of the member 252 remote from the center 238 is a frame bar 248 extending outwardly of the cylinder 272 and on which is mounted, coaxially of the member 252, a small air cylinder 246 the piston rod of which is colinearly connected to the rod 228.

To provide movement of the bead setting device 202 and its associated pressing ring 210, a pair of hydraulic fluid power cylinders 250 (best seen in FIG. 1) are mounted at the laterally outer ends of the bar 248. The piston rods 251 of the cylinders extend parallel to the axis 31 are are connected to the ring 210. Movement of the bead setting device 200 and its associated pressing ring 210 is effected by a pair of fluid power cylinders mounted on the housing 18 and having piston rods 257 connected to the latter ring 210. The member 252 forms a part of an interior carrier 260. A plurality of sets of roller guides 260 extend axially of and spaced circumferentially about the carrier. Each of the rollers of the guides is in rolling engagement with a guide surface extending longitudinally of the inner wall of the cylinder 212 enabling relative coaxial movement between the cylinder 212 and the carrier 260 to be effected by the cylinders 250. The force applied by the cylinder 250 to the pressing ring 210 and thereby to the bladder 170 is resisted by the structure including the frame bar on which the cylinders 250 are mounted and the member 252 to which the locking levers 220 are connected by the center 238. Engagement of the levers and the groove face 222 in the shaft 14 thus provides that the axial forces applied between the drum 12 and the pressing ring 210 are opposed entirely by the structure carrying the pressing ring and not by the base 16.

Operation of the apparatus 10 described herein will now be described. It is pointed out, first, that the tire building drum 12 is operable in at least two different modes. The first mode comprises placing one or more plies of tire fabric in cylindrical form circumferentially about the drum 12, portions of the ply width being extended outwardly onto each of the auxiliary drums 170. The bead setting devices 200, 202 then position the beads immediately adjacent to and coaxially about the respective ends of the drum 12 in radially spaced relation to the tire ply or plies. Compressed air is then admitted into the shoulder bladders 140, while simultaneously moving the end members 20 toward each other and the plane 76. The shoulder bladders 140 will expand or move radially outwardly while at the same time will tend to move axially outwardly of the drum. The ends of the cylindrical portion of the membrane 44 are thus expanded radially to the shape, as is indicated by 12', in FIG. 3. The initial radially expansive movement of the membrane 44 at the ends of the drum 12 moves the outermost ply into contact with the adjacent radially inwardly facing surfaces of the beads and the radially inward surfaces of the rings 204. Further radially outward movement of the ply at and axially outward of the plane of contact with the respective beads is prevented so that the diameter of the outer ends of the ply disposed axially outwardly of the bead rings and drum is maintained at least substantially unchanged during further expansion of the portion of the ply disposed between the bead rings. The subsequent radial expansion of the plies carried by the membrane 44 due to the action of the bladders 140 is accomplished simultaneously with axially inward movement of the devices 200, 202 carrying the respective beads and of the end members 20. The devices 200, 202 and end members are moved inwardly at an equal rate by a conventional hydraulic flow control circuit supplying fluid to the cylinders 250, 256 and to the hydraulic motor drivingly coupled to the screw 60 to achieve timed relation therebetween. As the end faces 122 approach their radial orientation as seen in FIG. 3, the outermost ply surfaces are pressed into adherent contact with the annular, axially inwardly facing surfaces of the beads, setting the beads in position. The bead setting devices 200, 202 are then retracted and the turn-up bladders 172 inflated thereby wrapping the plies thereon about the respective beads, the pressing rings 210 being again advanced into pressure contact with the turn-up bladders to urge the ply endings into adherent contact with the ply extending between the beads. Additional components, such as breaker or belt plies, are placed circumferentially about the drum. The fabric of the breaker or belt, being conformed to the cylindrical surface provided by the drum 12 retains the individual cords of the fabric in their intended side by side and regular spacing both during application and subsequent stitching. Tire tread material is then applied. The cylindrical surface of the tread can be of a diameter approximating the full diameter of the completed cured tire less only an amount sufficient to enable the tire to be placed in the curing mold. After the tire components are assembled the drum is contracted or collapsed by reducing the pressure within the bladders 140 and moving the end members 20 outwardly so that the tire can be removed.

A second mode of operation comprises expanding the drum 12 to its state 12' and placing thereon by winding or in endless band form a ply or plies, employing the drum in the manner of collapsible drums heretofore used in building certain tires. Ply endings extending outwardly of the shoulders 124 are then turned radially inward, by known devices or by hand, to lie against the end faces 122. The bead setting devices 200, 202 are then moved inwardly to set the beads 206 against the turned down plies and retracted. Turn-up bladders 172 are thereupon inflated to wrap the ply endings about the beads and the pressing rings 210 advanced to complete sealing of the turned up plies about the beads. The sequence can be repeated so as to build a tire having more than a single pair of beads.

The drum 12 is then collapsed to permit removal of the completed tire, even though the crown, or diametral change between expanded and collapsed condition is as much as 7 or more inches.

Figures 5, 6:
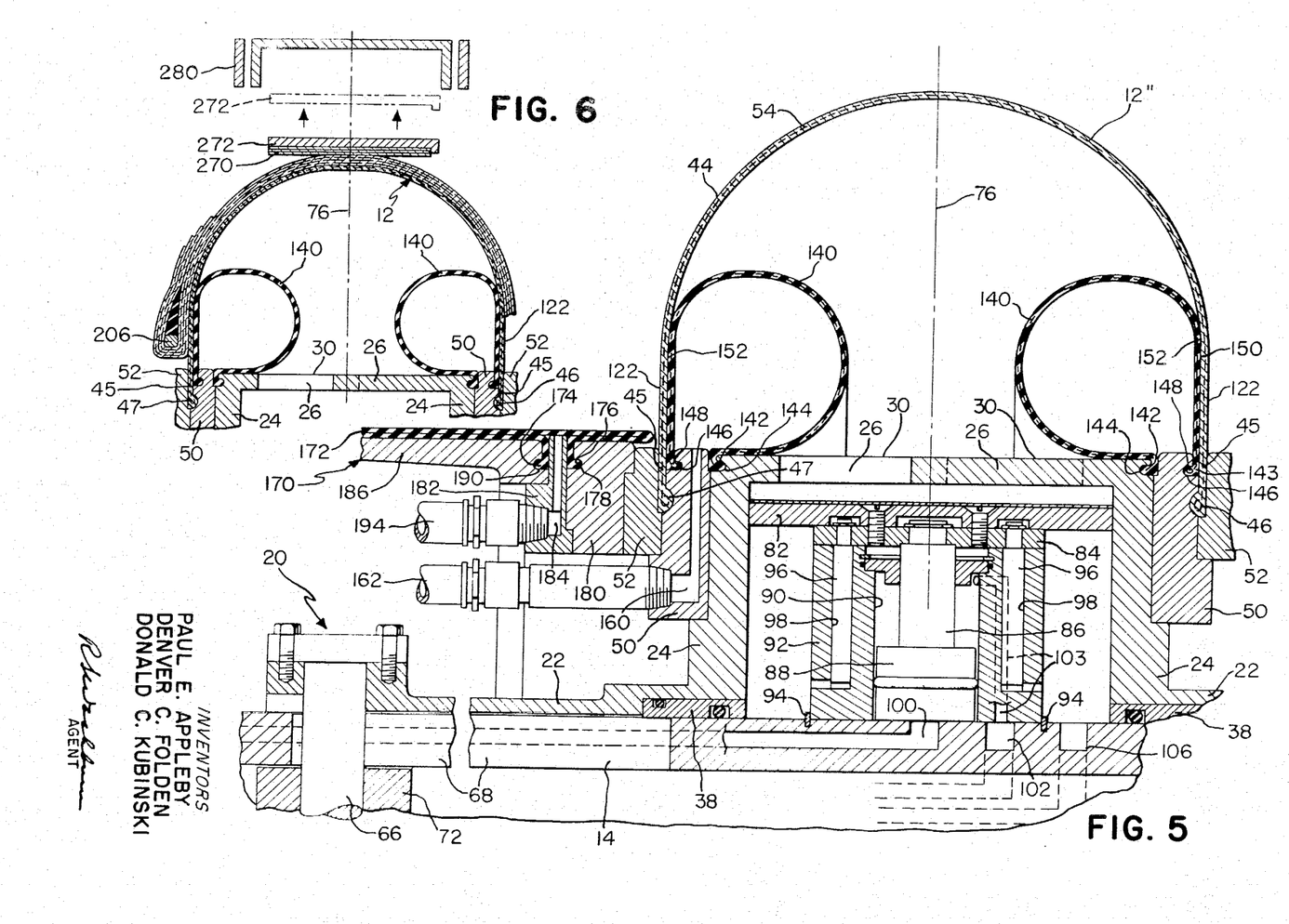
FIG. 5 is a partial longitudinal sectional view of the apparatus of FIG. 1, the drum being in a second expanded state.
FIG. 6 is a partial view in cross-section showing a stage in the operation of the apparatus of FIG. 1.

Making reference now to FIG. 5, the tire building drum 12 according to the present invention is adapted for further expansion, moving the end members 20 closer toward each other permitting circumferential expansion in the membrane 44 to form a toroidal shape 12''. The tire building drum state 12'' is adapted to facilitate application to the shaped tire carcass therein a relatively inextensible belt or breaker member and/or a tread. Air pressure admitted to the chamber 40 increasing the pressure therein to 2 or more atmospheres provides support as the additional components are applied to the tire. In the drum state 12'' shown in FIG. 4, the bladders 140 provide lateral support against the respective inner surfaces 152 of the membrane 44 effective to prevent or at least minimize any tendency for the intermediate portion of the membrane to be displaced axially by operations of stitching rollers.

Referring now to FIGS. 6 and 1, the versatility of the apparatus is further enhanced by the provision of means for rigidly supporting an endless inextensible belt member or ply in concentric surrounding relation with the drum 12 so that by expanding the membrane 44, the belt ply so supported and a tire carcass on the drum can be firmly and effectively united at least at the mid-circumferential centerline of the carcass and of the inner circumference of the belt ply. The support means comprises a ring 270 composed of a plurality of particylindrical plates 272 each movable radially inwardly to make up a continuous cylindrical ply supporting surface and outwardly to separate the plates 272 from the belt ply after it has been united with the carcass. The ring 270 is carried by an axially movable frame 280 mounted on the base 16 and is movable axially from a rest position, as seen in FIG. 1, to a position in axial register with and surrounding the drum, illustrated in FIG. 6, moving with the device 202 as the latter is moved into cooperative relation with the drum 12 in which relation the live center 238 enters into supporting relation with the end of the drum shaft 14. The frame 280 is then moved into an operative position placing the circumferential centerline of the ring 270 and of the belt into axial registry with the equatorial plane 76 of the drum by action of the hydraulic power cylinder 282.

It will be appreciated that the drum 12 described herein may be extensively varied in size and proportion from that shown. The drawings herein are illustrative of the principles of the invention and of the cooperation of the described members and parts. Dimensions should not be scaled from the drawings but will be applied as required to suit a particular tire or series of tires intended to be built.

While certain representative embodiments and details have been shown for the purpose of illustrating the invention, it will be apparent to those skilled in the art that various changes and modifications may be made therein without departing from the spirit or scope of the invention.

What is claimed is:

1. A tire building machine including a rotatable tire building drum comprising a tubular elastic membrane including a cylindrical portion the outer surface of which forms a tire building surface, said cylindrical portion terminating in an opposed pair of radially fixed end portions each mounted for movement coaxially of the other, means for effecting movement of said end portions toward and away from each other, and a pair of separate circumferentially integral expandable members axially fixed relative to said end portions radially inwardly of said cylindrical portion and respectively in circumferentially extending contact therewith next said end portions, said members being expandable radially and biased relatively with respect to said end portions and cooperable with said end portions for effecting radial expansion and predetermined shaping of said cylindrical portion to develop a crown and a shoulder extending radially outwardly and axially inwardly from said end portions.

2. A tire building machine as claimed in claim 1, wherein each said expandable member is annular and is disposed concentrically next to a respective fixed end within said membrane, each said member having a continuous membrane engaging surface extending about the longitudinal axis of said cylindrical portion.

3. A tire building machine as claimed in claim 2, wherein each said expandable member is an elastomeric inflatable bladder, and a rigid generally cylindrical member affixed to each of said end portions is disposed concentrically and radially inwardly of each bladder supporting the bladder and providing a rigid reaction surface against which the bladder acts during displacement thereof.

4. A tire building machine as claimed in claim 3, further comprising means anchoring each bladder near the next end of said cylindrical portion with the bladder extending a distance from the anchoring means toward the other bladder, whereby upon inflation each bladder will move in a direction radially and axially outwardly of said cylindrical portion.

5. A tire building machine as claimed in claim 1, further comprising means mounting the ends of said membrane in fixed relation radially with respect to the longitudinal axis of said cylindrical portion associated with said means for movement toward and away from each other, at least said cylindrical portion of said membrane being inextensible in a direction axially thereof and being circumferentially expansible.

6. A tire building machine as claimed in claim 5, wherein each said expandable member is annular and is disposed concentrically within said membrane and close to the respectively associated fixed end thereof, each said member having a continuous membrane engaging surface extending entirely about the longitudinal axis of said cylindrical portion.

7. A tire building machine as claimed in claim 6, wherein each said expansible member is an inflatable elastomeric bladder.

8. A tire building machine as claimed in claim 7, further comprising means anchoring each bladder near the next fixed end of said cylindrical portion with the bladder extending a distance from the anchoring means toward the other bladder, whereby upon inflation each bladder will move in a direction radially and axially outwardly of said cylindrical portion.

9. A tire building machine as claimed in claim 8, wherein each bladder has a fixed cross-sectional contour length, each bladder being expansible in a direction circumferentially about the axis of said cylindrical portion.

10. A tire building machine as claimed in claim 7, further comprising a rigid generally cylindrical member disposed coaxially within each bladder and radially supporting the same, each said cylindrical member providing support for said cylindrical portion of said membrane when the respectively associated bladder is deflated and providing a reaction surface against which the bladder acts during inflation thereof.

11. A tire building machine as claimed in claim 10, in which each bladder when deflated has an overall width as measured in a direction axially of said cylindrical member which is much greater than the overall thickness of the bladder as measured radially of said cylindrical member, each bladder having a fixed cross-sectional contour length, each bladder being expansible in a direction circumferentially of said cylindrical member.

12. A tire building machine as claimed in claim 11, further comprising means anchoring each bladder near the next end of said cylindrical portion with the bladder extending a distance from the anchoring means toward the other bladder, whereby upon inflation each bladder will move in a direction radially and axially outwardly of said cylindrical portion.

13. A tire building machine as claimed in claim 3, wherein each bladder is cylindrical in its uninflated condition, and means disposed next to the ends of said cylindrical portion of said membrane for anchoring the bladders radially with respect to said cylindrical members.

14. A tire building machine as claimed in claim 13, further comprising means mounting each cylindrical member and the bladder respectively associated therewith and the next end of said cylindrical portion of said membrane for simultaneous movement coaxially toward and away from the other end of said membrane.

15. A tire building machine as claimed in claim 14, in which said membrane is inextensible in a direction axially thereof and is expansible circumferentially thereof, each bladder being inextensible in a direction axially of said membrane and being expansible in a direction circumferentially of the membrane.

16. A tire building machine as claimed in claim 15, wherein each bladder when deflated has a first extended cylindrical portion coaxially engaged with and within said membrane with one end thereof being disposed near the next end of said cylindrical portion of said membrane, said first cylindrical portion of said bladder terminating at the other end thereof in one end of a bight portion the other end of which terminates at one end of a reentrant second cylindrical portion engaging coaxially with and within said first cylindrical portion of said bladder, and means anchoring said one end of said first cylindrical portion of said bladder axially relative to the respectively associated fixed end of said membrane and the other end of said second cylindrical portion thereof radially with respect to the respectively associated cylindrical member and both ends continuously about the circumference of said cylindrical member.

17. A tire building machine as claimed in claim 16, wherein said one end of said first cylindrical portion of said bladder and the other end of said second cylindrical portion thereof are spaced apart axially of the respectively associated cylindrical member a distance less than one-fourth of the cross-sectional contour length of said bladder.

18. A tire building machine as claimed in claim 17, further comprising means for introducing pressurized fluid within said membrane during movement of the ends of said cylindrical portion of said membrane toward each other to radially expand the membrane from a generally cylindrical first condition of a first diameter to a generally cylindrical second condition of a larger diameter than said first condition.

19. A tire building machine as claimed in claim 1, wherein said pair of radially expandable members are spaced apart on opposite sides of the central portion of said membrane, and means engageable with the interior surface of said central portion of said membrane while the membrane is in an unexpanded cylindrical state, the last mentioned means including a plurality of rigid segments having parti-cylindrical outer surfaces, and means mounting said segments for limited movement radially of said membrane and into and out of supporting engagement with the central portion of said membrane.

20. A tire building machine as claimed in claim 1, further comprising a bead setting device movable into coaxial nearby relation with each end portion of said membrane, said membrane being radially expandable from a first generally cylindrical condition to a second generally cylindrical condition of greater diameter than said first condition, means mounting the ends of said cylindrical portion of said membrane for movement toward and away from each other, and drive means for moving the bead setting devices in timed relation with movement of the ends of said cylindrical portion toward each other and while said membrane is being expanded from said first condition to said second condition.

21. A tire building machine as claimed in claim 1, further comprising a ply turn-up bladder operatively associated with and positioned outwardly of and adjacent an end of said membrane, a pressing member movable to and from a position remote from said drum and into cooperative engagement with the turn-up bladder to urge the same axially inwardly toward said membrane and freely away therefrom, a shaft extending coaxially of said membrane, and air-actuated lock means for releasably connecting the pressing member and said shaft whereby force exerted axially between said turn-up bladder and said pressing member is opposed by the force exerted axially between said lock means and said shaft.

22. A tire building machine as claimed in claim 21, wherein said air-actuated lock means includes a plurality of levers pivotally mounted for limited movement about axes fixed relative to said pressing member, said levers having hooks engageable with means comprising an annular groove formed in said shaft, and actuating means movable coaxially of said shaft in a first direction to engage a first portion of said levers to cause said levers to move pivotally into engagement with said annular groove and in the second direction to engage a second portion of said levers to cause the same to move out of engagement with said groove.

23. A tire building machine as claimed in claim 5, further comprising means for introducing pressurized fluid within said membrane during expansion of said radially expandable means, said membrane being expandable from a generally cylindrical first condition to a generally cylindrical second condition of at least 6 inches larger diameter than said first condition, said radially expandable means providing said membrane in said second condition thereof with a pair of annular axially outwardly facing surfaces at the end portions thereof.

24. A tire building machine including a tire building drum comprising a generally cylindrical and radially expandable building sleeve the outer surface of which forms a tire building surface, the axially outward terminal ends of said sleeve being fixed radially and movable axially with respect to the longitudinal axis of said sleeve, circumferentially integral first means separably disposed inwardly of the innermost surface of said sleeve between and respectively associated with said ends, for rollably engaging and exerting radially and axially outwardly directed forces on said innermost surface over two portions thereof spaced apart on opposite sides of the central portion of the sleeve to expand said two portions of the sleeve to provide an extended cylindrical central portion and an opposing pair of annular radially extending and axially outwardly facing shoulder surfaces at the ends of the expanded sleeve, and second means for exerting over the interior of the central portion of the sleeve and between said two portions thereof a radially directed force of lesser magnitude than the forces exerted by said first means.

25. A tire building machine as claimed in claim 24, further comprising means for moving the ends of said sleeve toward and away from each other, said first means comprising an annular radially expansible member disposed concentrically within said sleeve next to each end thereof, each said member having a continuous sleeve engaging surface extending along and about the longitudinal axis of the sleeve.

26. A tire building machine as claimed in claim 25, wherein each said expansible member is an elastomeric inflatable bladder.

27. A tire building machine as claimed in claim 26, further comprising a rigid cylindrical member disposed coaxially within each inflatable bladder and supporting the same radially of the said axis and providing a reaction surface against which the bladder acts during the expansion thereof, means anchoring each bladder relative to its respectively associated cylindrical member and the next end of said sleeve, each bladder extending from its anchoring means a distance toward the opposite end of the sleeve, whereby upon inflation the bladder will be expanded radially outwardly of said axis and will tend to move axially outwardly relative to the next end of said sleeve.

28. A tire building machine as claimed in claim 27, wherein said sleeve is inextensible in a direction axially thereof and is extensible circumferentially thereof, each bladder being inextensible in the direction of said axis and being extensible in a direction circumferentially of said sleeve.

29. A tire building machine including a tire building drum comprising a flexible cylindrical building sleeve the axial ends of which are fixed radially with respect to the drum axis and the outer surface of which forms a tire building surface, a pair of coaxially arranged rigid cylindrical tubular members received within the opposite end portions respectively of said building sleeve, said cylindrical members being of equal outer diameter and being spaced apart axially of said sleeve, said cylindrical members each providing a rigid outer cylindrical surface for the radial support of said building sleeve, means mounting said cylindrical members for movement toward and away from each other between a first position wherein said members are spaced apart axially of said sleeve and a second position wherein said members are disposed closer to each other, and central support means within said sleeve for providing rigid radial support of the central portion of said sleeve at a radial height equal to the radial height of the portions of said sleeve overlying said rigid cylindrical tubular member disposed between said cylindrical members when said cylindrical members are in said first position, said central support means being retractable independently of the movement of said members and radially inwardly of said sleeve to permit movement of said cylindrical members from said first position to said second position.

30. A tire building machine as claimed in claim 29, wherein said central support means includes a plurality of segments having arcuate sleeve engaging surfaces disposed coaxially within said sleeve, and means mounting said segments for movement radially relative to said sleeve between a first outer position and a second inner position, said cylindrical members being arranged telescopically over said segment when said cylindrical members and said segments are in a second position thereof.

31. A tire building machine as claimed in claim 30, wherein said segments have axially facing end portions engageable with means mounted for movement with said cylindrical members to limit the movement of said cylindrical members toward each other.

32. A tire building machine as claimed in claim 29, further comprising a shaft extending coaxially of said building sleeve, said means mounting said cylindrical members comprising a pair of tubular members disposed coaxially over said shaft and each terminating at its axially inner end in a radially outwardly extending web means the outer end of which terminates in one of said cylindrical members, said central support means comprising means carried by said shaft and providing a plurality of cylinders spaced about and extending radially of the shaft axis, a plurality of pistons respectively within said plurality of said cylinders and a plurality of segments respectively associated with and mounted for movement with said pistons, said pistons being movable radially outwardly to locate said segments in a first position, each segment having an outer parti-cylindrical surface having a radius of curvature equal to the radius of curvature of the cylindrical surfaces provided by said cylindrical members, said outer surface of each segment being aligned with said cylindrical surfaces in said first position of said segment, said pistons being movable radially inwardly of said shaft to locate said segments in a second position wherein said segments are spaced radially inwardly of said cylindrical members.

33. A tire building machine including a tire building drum comprising a flexible cylindrical building sleeve the axial ends of which are fixed radially with respect to the drum axis and the outer surface of which forms a tire building surface wherein said building sleeve includes a cylindrical portion the ends of which terminate in portions extending radially inwardly toward the axis of said shaft, a pair of bladders disposed within said cylindrical portion of said sleeve and respectively adjacent the opposite ends of said cylindrical portion, each bladder comprising a first cylindrical portion disposed coaxially of said sleeve and terminating at one end in a portion extending radially inwardly of the shaft axis along side the next adjacent radially inwardly extending portion of said sleeve, means fixed with respect to the next adjacent one of said web means for clamping the next adjacent radially inwardly extending portions of said bladder and sleeve relative to each other and said one of said web means, said first cylindrical portion of said bladder terminating at the other end thereof in a bight portion connecting to a second reentrant cylindrical portion of said bladder disposed coaxially within said first cylindrical portion of said bladder and engaged coaxially over the respectively associated cylindrical member, the axially outer end of said reentrant cylindrical portion being anchored to said cylindrical member in axially spaced relation to the radially inwardly extending portion of said bladder.

34. A tire building machine as claimed in claim 29, wherein each of said segments has end portions engageable with said web means when said segments are in said second position thereof to limit movement of said cylindrical members toward each other, and means releaseably connecting said segments to said pistons to permit interchangeability of said segments with segments of different lengths as measured parallel to said shaft axis.

35. A tire building machine as claimed in claim 33, wherein said building sleeve is reinforced so as to be inextensible in a direction parallel to said shaft axis, said building sleeve being expansible in a direction circumferentially thereof, each of said bladders being reinforced so as to be inextensible in a direction parallel to said shaft axis and being expansible in a direction circumferentially about said axis.

36. A tire building machine as claimed in claim 35, further comprising a pair of auxiliary drums disposed coaxially of said shaft and axially outwardly of the opposite ends respectively of said building sleeve, and a pair of turn-up bladders respectively mounted on said pair of auxiliary drums.

37. A tire building machine as claimed in claim 36, further comprising fluid pressure sealing means between said tubular sleeves and said shaft whereby said sleeves and shaft in part provide a sealed chamber, means for introducing pressurized fluid within said chamber, and means for introducing pressurized fluid within each bladder disposed within said building sleeve.

* * * * *